United States Patent [19]

Yaffe

[11] Patent Number: 4,726,789
[45] Date of Patent: Feb. 23, 1988

[54] ANTI-THEFT MOUNTING APPARATUS

[76] Inventor: Moshe Yaffe, 240-25 69th St., Douglaston, N.Y. 11362

[21] Appl. No.: 903,954

[22] Filed: Sep. 2, 1986

[51] Int. Cl.⁴ .................................................. H01R 13/60
[52] U.S. Cl. .................................... 439/567; 439/297; 439/627
[58] Field of Search .................... 339/10, 119 R, 91 R, 339/152; 248/27.1, 27.3; 312/242, 245; 439/34, 266, 297, 527, 544, 567, 627

[56] References Cited

U.S. PATENT DOCUMENTS

| | | | |
|---|---|---|---|
| 4,524,933 | 6/1985 | Rouws | 248/27.3 |
| 4,555,080 | 11/1985 | Nara | 248/27.1 |
| 4,572,465 | 2/1986 | Rasca | 248/27.1 |

Primary Examiner—Eugene F. Desmond
Attorney, Agent, or Firm—Plevy & Gittes

[57] ABSTRACT

Anti-theft audio component mounting apparatus is provided in accordance with the teachings of the present invention. A sleeve member specifically configured to easily mount within a vehicle dashboard is arranged to be tightly secured and mounted within such dashboard and accept all connections provided in the dashboard for a dash mounted audio component. A cap member for accepting all electrical connections from a selected audio component is provided for mounting over an end portion of the selected audio component in such manner as to seal the end portion of the audio component. The cap member is provided with a plurality of externally available, recessed contacts and the sleeve member is provided with a corresponding plurality of internally disposed contacts. This enables a selected audio component having the cap member mounted thereon to be placed into the sleeve member to house the audio component and cause each of the plurality of internally available recessed contacts in the cap member to engage a corresponding one of the plurality of internally disposed contacts establishing interconnection therebetween while allowing the selected audio component and mounted cap member secured hereto to be removed from the sleeve for retention by a user during periods when said vehicle is at risk.

27 Claims, 10 Drawing Figures

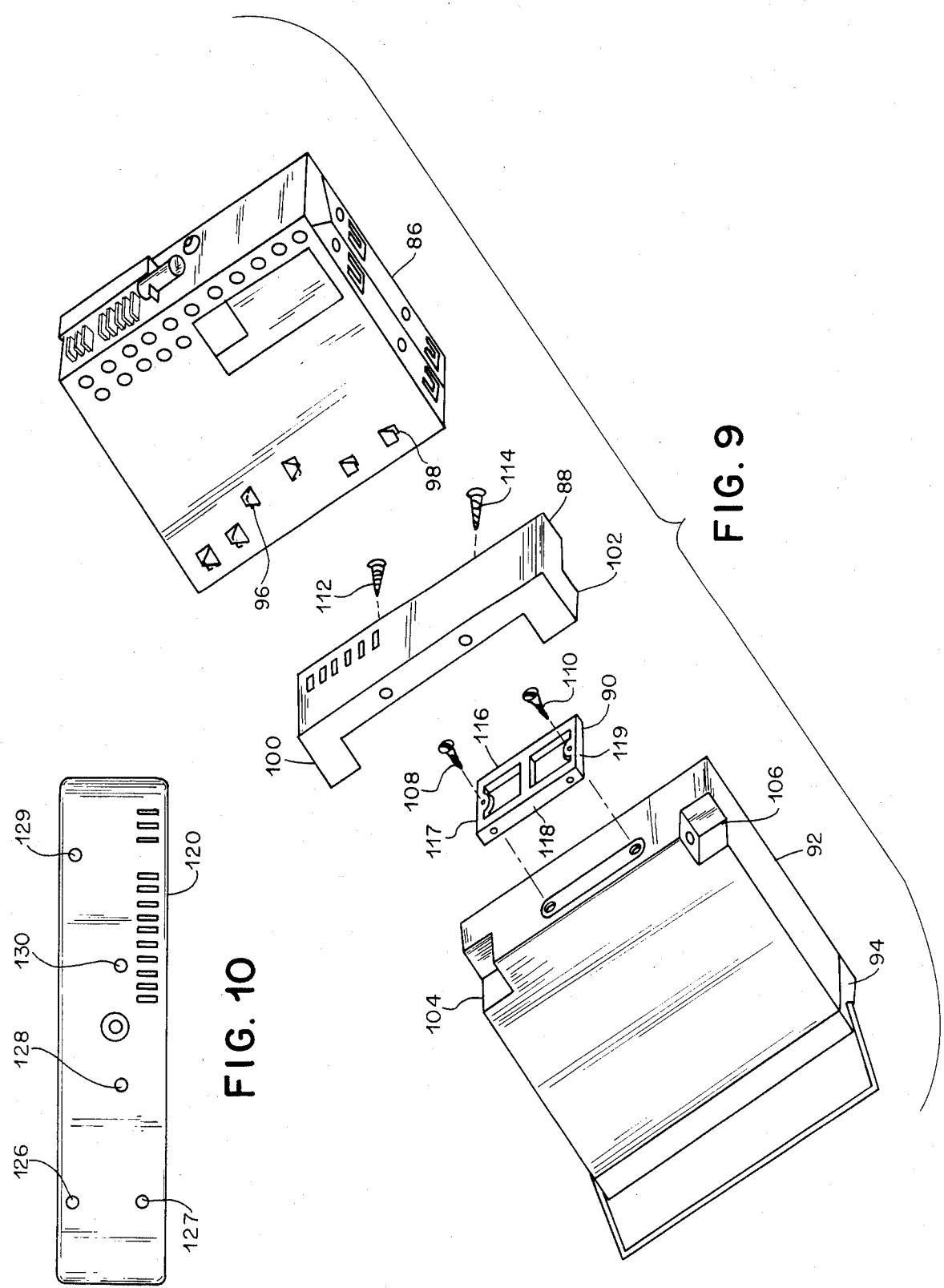

ANTI-THEFT MOUNTING APPARATUS

BACKGROUND OF THE INVENTION

This invention relates to anti-theft mounting apparatus for mobile audio components and more particularly to apparatus enabling audio components to be removably mounted in dashboard locations in such manner that the same may be readily removed by the user when the vehicle is to be left unattended.

The proliferation of high quality audio systems for use in automobiles and the like, as provided both by automobile manufacturers and "after market" sources, coupled with the desire of many individuals to have high quality audio systems in their vehicles has made the problem of theft of car radios and other mobile audio components rampant. In fact, it is not uncommon in walking through a parking lot of a popular shopping center or a street in a metropolitan area to observe vehicles whose passenger windows have been smashed and the audio system stolen. This is particularly prevalent where the vehicle has been provided with an expensive tuner-tape, disc player and/or equalizer system which is dashboard mounted.

It is not uncommon for the owner of a vehicle to install audio components in the dashboard of a vehicle whose cost may rnage from $500 to several thousand dollars. Such components are installed by an owner for purposes of personal enjoyment and seemingly, once installed, render the vehicle an attractive target for both professional thieves and amateurs. The problem of theft of audio components from vehicles has become so intense that loss of a radio or other audio component from a vehicle has become a common experience. As a result, owners of vehicles who contemplate the installation of a quality audio system often feel compelled to install expensive alarm systems or alternatively are forced to forego the pleasure derived from such a quality audio system.

In fact, it is not uncommon in strolling through a parking area to observe vehicles on which a notice is prominently displayed stating that there is no radio in the vehicle. This is done since theft of audio components from vehicles has become so widespread that thieves are often indiscriminate. The problem has become so severe that when one goes to an after market supplier to install a new radio or other audio system in a vehicle, the person is often advised that such system should not be mounted in too secure a manner since if an attempt is made to steal the same a thief finding the component is not readily removable will do so much damage to the dashboard of the vehicle as to make the cost of repair impractical.

Many techniques have been developed in attempts to alleviate this problem. Thus, certain maunfacturers make cover plates whose purpose is to disguise the radio or other audio component installed in a dashboard so as to indicate that no radio is present or at least give the impression to a casual observer that a very inexpensive model has been installed. These techniques generally fail since on close inspection through the window of the vehicle the nature of the cover plate is readily discernible. In addition many thieves are indiscriminate as to the nature of the audio component present. Alarm systems have been developed by the manufacturers and are frequently available as original equipment from automobile manufacturers. However, only very expensive models of alarm systems in fact detect breakage of a window through which the thief typically gains access to the audio component and in addition alarm systems have not generally proved highly satisfactory since a thief who breaks a window and reaches in to steal a dash-mounted audio component can frequently accomplish his objective in such a short time that the sounding of an alarm for a short period is of little concern.

More sophisticated approaches to preventing theft of audio components from vehicles have taken the form of the development of the so-called anti-theft radio, techniques where the majority of the audio components are in fact trunk mounted and only remotely controlled from the dashboard and audio components which are portably mounted in the vehicle and removable by the owner when the vehicle is at risk. The so-called anti-theft radio, as developed for instance by Alpine, includes a device which prevents the audio component from ever operating again, once power is removed, unless an appropriate code is first entered on the selection keys of the audio component when the same is reinstalled in a vehicle. This approach is currently employed on BMW's sold in the United States; however, the approach is disadvantageous in two respects. The first is that while the radio may not be successfully reinstalled by an amateur thief without the appropriate combination, this in no way changes the fact that the owner of the vehicle has lost a radio due to theft and must go through the costly procedure of replacing the same. Furthermore, a knowledgeable thief can readily avoid the anti-theft technique being employed by pulling out the radio and connecting a small battery thereto prior to its disconnection from the power source in the vehicle.

Similarly, trunk mounting techniques are not wholly sucessful since the audio components operating in this manner are quite expensive, dash mounted control units therefor are often stolen where the thief is under the impression that a complete audio component is being taken and, in any event, damage is incurred due to the thief's penetration of the vehicle prior to discovery that only a remote control unit is involved. Finally, such units telegraph the fact that the rest of the audio components are in the trunk of the vehicle and frequently cause the thief to break into this section of the vehicle as well.

In fact, the most successful attempts at preventing theft of audio components from cars has been the development of portable units. This has been done, for example by Soundstream Corporation and Sony Corporation and effectively provide for a dash-mounted radio or tuner-tape deck and amplifier component which can easily be removed by the owner of the vehicle when the vehicle is parked and left at a location where the same is at risk. When the audio component is removed from the dashboard a gaping hole is left making it apparent to a casual observer that breaking into the vehicle for purposes of stealing the audio component would be pointless. While the technique of providing a portable mounted audio component is effective, the same is generally available only from specific manufacturers of audio components and hence is not of general application. Thus, vehicle owners wishing to avail themselves of this technique must purchase the components provided by these manufacturers and are often faced with the prospect that the mounting configuration provided is not suitable for the vehicle owned.

Therefore it is a principal object of the present invention to provide improved anti-theft mounting apparatus.

An additional object of the present invention is to provide anti-theft mounting apparatus specifically configured to accommodate any of the large number of dashmounted audio components provided by both after market and original equipment manufacturers.

A further object of the present invention is to provide anti-theft mounting apparatus specially configured to mount in any of a large number of dash-mounting facilities provided by vehicle manufacturers.

Another object of the present invention is to provide anti-theft mounting apparatus for vehicles which involves both audio component mounting members and dashboard mounting members and enables a user thereof to achieve a specially configured mounting arrangement by merely specifying the type of vehicle involved and the audio component to be used therewith.

Various other objects and advantages of the present invention will become apparent from the following detailed description of an exemplary embodiment thereof and the novel features will be particularly pointed out in conjunction with the claims appended hereto.

SUMMARY OF THE INVENTION

In accordance with the teachings of the present invention, anti-theft audio component mounting apparatus is provided wherein a sleeve member specifically configured to easily mount within a vehicle dashboard is arranged to be tightly secured and mounted within such dashboard and accept all connections provided in the dashboard for a dash-mounted audio component; a cap member for accepting all electrical connections from a selected audio component is provided for mounting over an end portion of a selected audio component in such manner as to seal the end portion of the audio component, the cap member being provided with a plurality of externally available recessed contacts and the sleeve member being provided with a corresponding plurality of internally disposed contacts enabling a selected audio component having the cap member mounted thereon to be placed into said sleeve member to house said audio component therein and cause each of the plurality of externally available recessed contacts in the cap member to engage a corresponding one of the plurality of internally disposed contacts and establish an interconnection therebetween while allowing the selected audio component and mounted cap members secured thereto to be removed from the sleeve for retention by a user during periods when such vehicle is at risk.

BRIEF DESCRIPTION OF THE DRAWINGS

The invention will be more clearly understood by reference to the following detailed description of an exemplary embodiment thereof in conjunction with the accompanying drawings in which:

FIG. 9 is an exploded view of another exemplary embodiment of the present invention; and FIG. 10 illustrates another embodiment of a cap member usable in the embodiment of the invention illustrated in FIG. 8.

DETAILED DESCRIPTION

Figure 1:
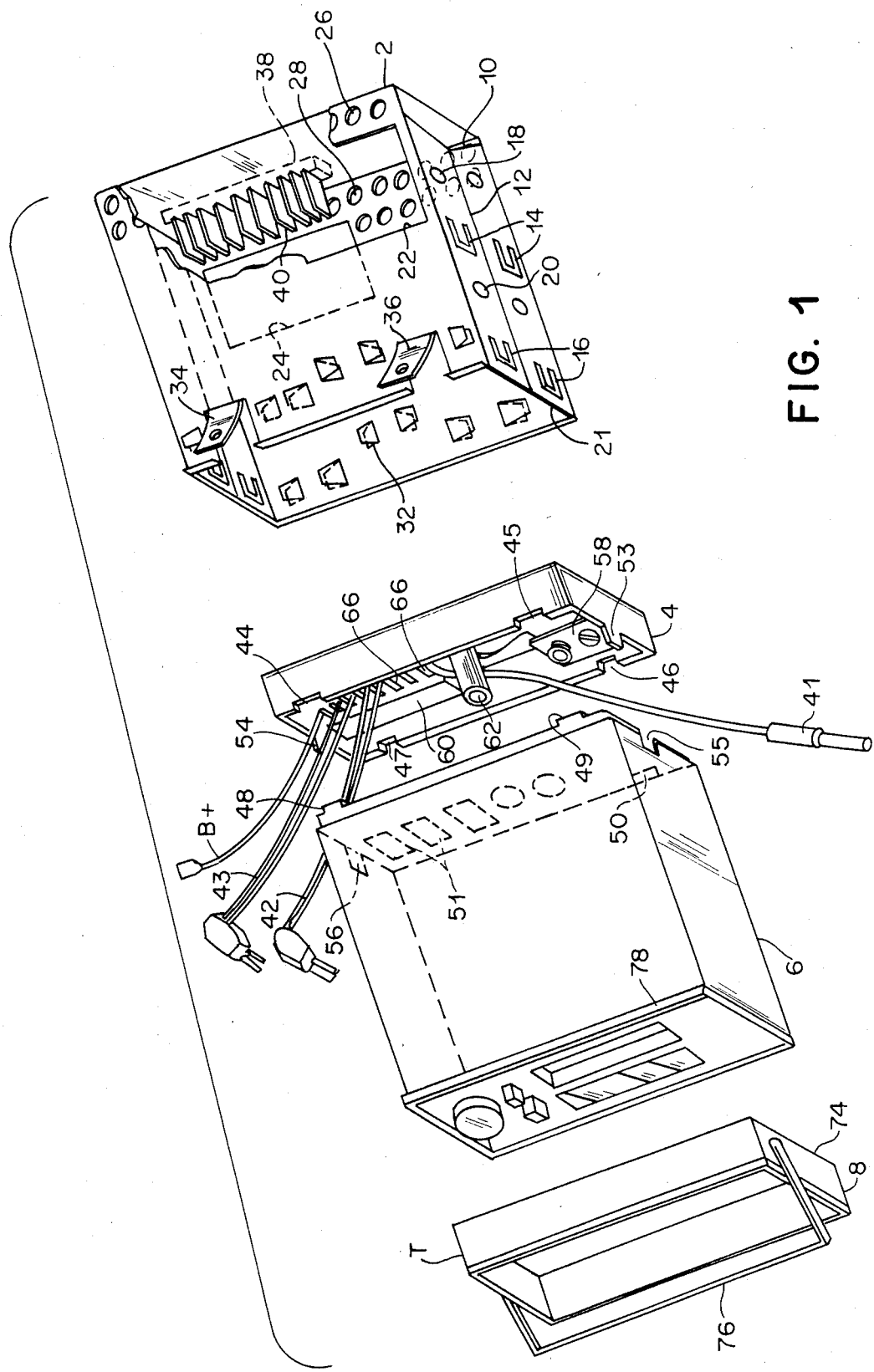
FIG. 1 is an exploded view of an exemplary embodiment of the instant invention illustrating the manner in which a selected dash-mounted audio component may be mounted therein.

Referring now to the drawings and more particularly to FIG. 1 thereof, there is shown an exploded view of an exemplary embodiment of the instant invention illustrating the manner in which a selected dash-mounted audio component may be mounted therein. The exemlary embodiment of the invention illustrated in FIG. 1 comprises a sleeve member 2 for insertion into a dash of a vehicle in precisely the same manner as audio components such as radios or tuner-tape and amplifier combinations are presently mounted therein. In addition, a cap member 4 is provided for fixedly mounting to the rear of an audio component 6 and a handle bracket 8 is provided for mounting to the audio component 6 enabling the same to be easily pulled from the sleeve member 2 and taken by the vehicle operator when the vehicle is left in a position of risk.

Figure 4:
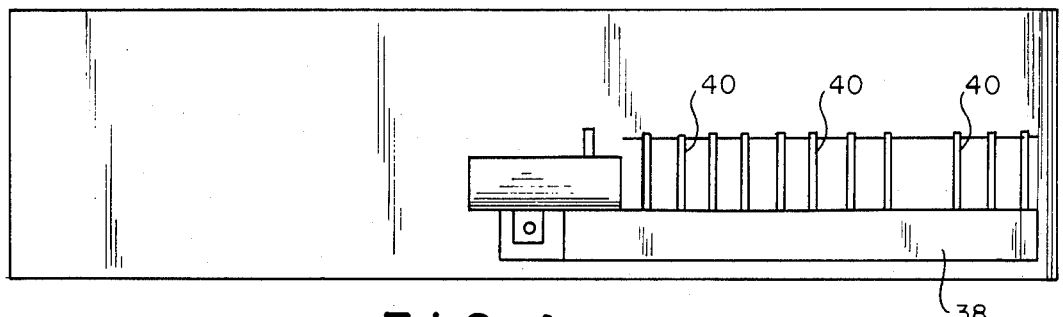
FIG. 4 is a rear view of an exemplary sleeve member showing the contacts thereon.
Figure 6:
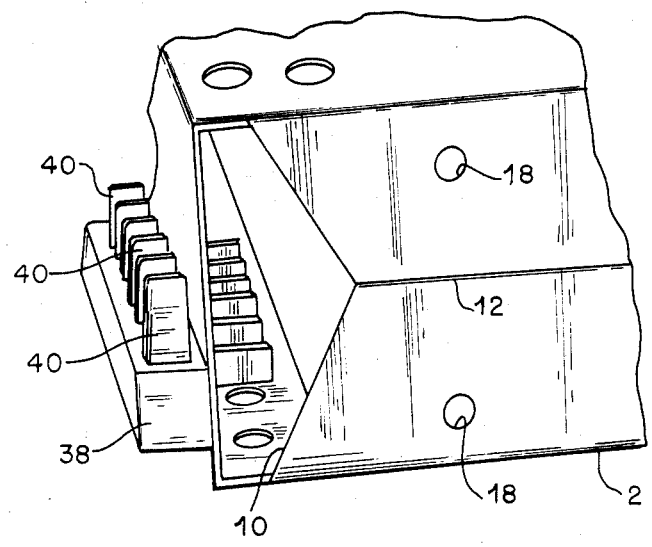
FIG. 6 is a side view of the exemplary sleeve member shown in FIG. 4.

The sleeve member 2, as also shown in FIGS. 4 and 6, is preferably formed of thin sheet metal whose thickness may typically range from ½ mm. to 2 mm. The relatively thin sheet metal employed for the sheath member is purposely selected so that the same may accept an audio component 6 therein and still fit within the aperture in a vehicle dashboard as sized by the manufacturer for an audio component. Thus, in the case of the sleeve member specifically configured for a Mercedes vehicle the ½ mm. thickness sheet metal is preferred while in the case of a BMW a 2 mm. thickness may be employed. The sleeve member 2 is generally rectangular in shape, as illustrated, and may be formed through conventional stamping techniques and then formed into the desired rectangular shape. On each side of the sleeve member 2 is provided a generally V-shaped cutout 10 whose apex coincides with the side seam 12 of the sleeve member 2. Additionally, on each side of the same are a pair of rectangular cutouts 14 and 16 as are pairs of apertures 18 and 20. It should be noted that both sides of the sleeve member 2 are constructed in identically the same manner.

The function of the V-shaped cutouts 10 is to enable the sleeve member 2 to be placed into the aperture in the dashboard provided for an audio component, such as a radio, through force fitting techniques and the like and prevent the sleeve member 2 from being deformed. Thus, when the sleeve member 2 is inserted into the aperture in a dashboard, provided by the manufacturer of a vehicle, the V-shaped cutouts 10 on each side of the sleeve member 2 will trim away minor obstacles in its path and if any deformation from the force fit occurs such deformation will occur along the seam 12 on each side of the device in a symmetrical manner so that a substantial deformation does not result. The pairs of U-shaped cutouts 14 and 16 are provided on each side of the sleeve member 2 so that once the sleeve member 2 is forced into the cutout in the dashboard the same may be forced outward by pressure from a screwdriver or the like and lock the sleeve member 2 into the dashboard through engagement of structure within the dashboard. For a Mercedes vehicle the pair of U-shaped cutouts 14 are disposed 90 mm. behind the front edge 21 of the sleeve member which front edge is provided with an outwardly extending flange as shown. When this is done, interior structure of the dashboard may be readily engaged by deforming the metal tongue within the U-shaped cutout from a position parallel to the outside of the sleeve member 2 to a position where the same is outwardly disposed. The pairs of apertures 18 and 20 are provided to allow cooling of the audio component 6 when the same is disposed within the sleeve member 2.

A large rectangular cutout 22 and 24 is provided on the top and bottom of the sleeve member to additionally facilitate cooling as well as to provide a weakened area on each of the top and bottom surfaces to accommodate force fitting of the sleeve member within the dashboard. As will be apparent upon inspection of FIG. 1, each of the large overlapping cutouts 22 and 24 extend from a location near the side of the sleeve to approximately half way across the top or bottom section in which it is present and in each case the large overlapping cutouts 22 and 24 start from opposite sides of the sleeve member 2 so that the same are coaxial and the inward edge of each cutout is approxmately spacially aligned. Additional pairs of apertures are arranged in pairs along the rearmost portion of the sleeve member 2 to provide additional cooling while tapered cutouts 30 and 32 are provided near the flange 21 at the front edge of the sleeve member 2. The tapered cutouts 30 and 32 are preferably not aligned but disposed in the manner indicated in FIG. 1 to accommodate dashboard apertures whose surrounding material varies in thickness. This function is enhanced by shaping the tapered cutouts 30 and 32 so that the aslantly disposed front edge thereof is widest at the surface of the sleeve member 2 and becomes more narrow toward the end of the cutout. Thus, those of ordinary skill in the art will appreciate that when the sleeve member 2 is inserted within the aperture provided in the dashboard, and the pressure from a screwdriver or the like is employed to bend the metal surrounded by the tapered cutout in an outward direction, the varied positions of the different cutouts, as well as the slantly disposed front edge thereof, will insure that substantial thickness variations in the dashboard will be accommodated. Thus, at least a pair of tongue members, from the top and bottom surface, will tightly engage behind dashboard cutout. In addition, for a sleeve member specially configured for a Mercedes, a pair of bendable projections 34 and 36 are provided so that when the same are bent up after the sleeve member has been put in place, the same will engage portions of the ashtray mount to further lock the sleeve member 2 to within the dashboard cutout.

Figure 5:
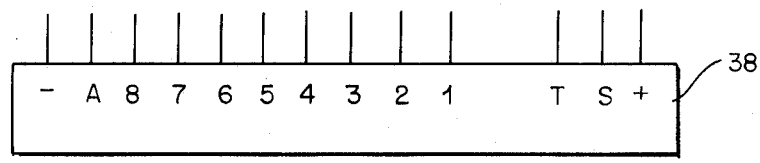
FIG. 5 is a front view illustrating an exemplary contact marking arrangement for the embodiment of the sleeve member shown in FIG. 4.

Each sleeve member is provided with a terminal block 38 mounted through a cutout in the rear wall of the sleeve member in the manner best illustrated in FIG. 6. The terminal block 38 comprises a plurality of L-shaped contacts 40, as best shown in FIG. 6 to accommodate each connection provided in the dashboard for an audio component as well as each connection provided by the cap member 4 to the audio component 6. More particularly, each L-shaped contact 40 within terminal block 38 extends from the back of the sleeve member 2 in the manner best shown in FIGS. 4 and 6 and in addition extends into the hollow of the sleeve member 2 in a manner best shown in FIGS. 1 and 6 so that the same may be mated on a plug compatible basis with contacts present in the cap member 4 in the manner best shown in FIGS. 2, 7 and 8. Typically, the terminal block 38 would have annotations thereon such as shown in FIG. 5 indicating the wire in the dashboard which is to be connected thereto. Exemplary connections are listed below, however, it will be appreciated by those of ordinary skill in the art that since different sleeve members 2 may be developed for different vehicles the terminal block 38 may also be marked differently or differently configured for different vehicles. For the exemplary terminal block 38 illustrated in FIG. 5, the various annotations associated with the extending terminals may be as follows:

+—ignition to radio
s—power to antenna lead
1—right speaker negative
2—right speaker positive
3—left speaker negative
4—left speaker positive
5-7 & T—special purpose depending on vehicle and component type
A—antenna positive
——negative power Furthermore, as readily indicated in FIG. 4, a female antenna connection whose ground shield connects to the terminal annoted "—" may be premounted on the terminal block 38. In addition, in alternate embodiments of the instant invention, rather than merely bringing out copper spade lugs or the like for connections to wires provided in the dashboard, alternate terminal block arrangements may be employed to bring out wires with appropriate connectors for connecting on a plug compatible basis with wires provided by the manufacturer of the vehicle in the dashboard.

Those of ordinary skill in the art will also appreciate that the sleeve member 2 may also be provided with a peripherally disposed seam so that the same may be formed with different backs and fronts to accommodate a greater number of vehicles without a need for special stamps for each vehicle. Thus, by intermixing various fronts and backs, many more vehicle mounting arrangements may be accommodated. This is especially so if the sleeve member 2 is made of galvanized steel or the like which is sufficiently rigid so that front and back members of the seam can be provided with common fittings which may be preformed and spot welded.

Figure 2:
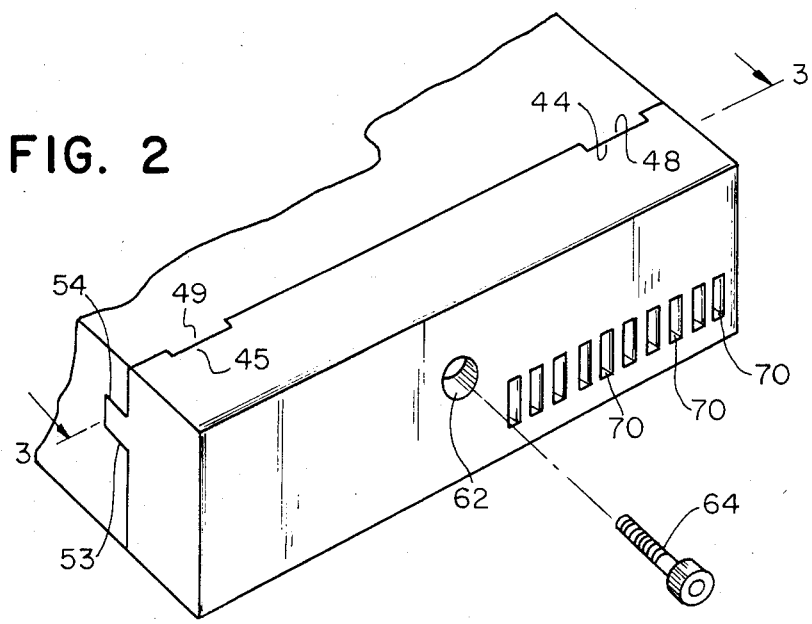
FIG. 2 is a pictorial view, partially cut away, of an exemplary cap member for the embodiment of the invention illustrated in FIG. 1.
Figure 3:
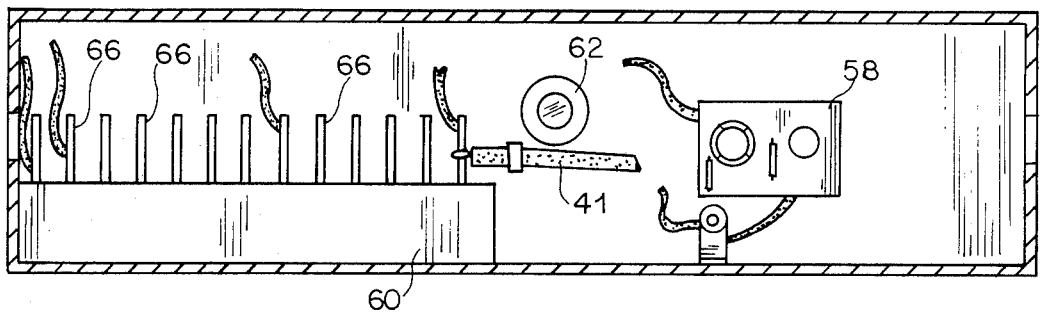
FIG. 3 is a front view of the exemplary cap member shown in FIG. 1 illustrating the internal connections and structure thereof.

The cap member 4, as shown in FIGS. 1-3 is specifically configured to fit over the rearmost portion of the audio component 6 in such a manner as to seal the unit and prevent dust from adversely affecting the terminals therein. The cap unit 4 is provided with a separate connection for each connection required by the audio component 6 and is arranged to fit within the sleeve 2 when mounted on the audio component 6 and to be plugged compatible with the internally disposed L-shaped contacts 40 on the terminal block 38. Thus, in essence, within the cap member 4 is provided each connector for the audio components 6 which would normally be provided to that audio component from connectors disposed within the dashboard by the manufacturer of the vehicle. Such connections would typically be identical to those described in connection with the markings on FIG. 5. Thus, as generally indicated in FIG. 1, an individual antenna connection 41 is connected to the terminal block 60 suitable for direct connection to the antenna plug on the audio component 6 while similarly right and left speaker leads 42 and 43 are provided with appropriate connections for direct plug-in to the back of the audio unit 6. Additionally, a power connection indicated as B+ is also provided. Those of ordinary skill in the art will appreciate that additional conductors, not shown, would also be provided in the same manner for direct plug-in to the audio component 6. Such additional connections would, of course, involve power for the antenna lead antenna, standby power for memory, ground connections, additional inputs such as for a CD player and/or additional channels depending upon the nature of the audio component selected.

The cap member 4 preferably will be specially configured for each major brand of mobile audio component and as such will securely fit over the back of the audio component in such manner as to fit on the flanged portion of the back where terminal connections are normally provided. In addition, the cap member 4 will have cutouts 44–47 for each protrusion 48–51 provided on the audio component 6 and will have protrusions 53 and 54 to fit each of the cutouts 55 and 56 on the audio component. In this manner, a secure fit of the cap member 4 over the back end of the audio component 6 is created in such manner that only a longitudinal extension of the audio component 6 results. The cap member 4 may also be provided with battery terminals 58 as best shown in FIGS. 1 and 3 to enable a 9 volt cell to be mounted therein. The battery terminals 58 may be connected in parallel with the power leads on the terminal block 60 so that when the audio component is removed from the sleeve 2 station presets, a clock function, if present, and functions such as DOLBY B and C, tape bias loudness contour and the like, may be retained in the memory of the audio component 6. Although not illustrated in FIG. 1, a beeper or other audible and/or visual indicia may be mounted within the cap member 4 to provide an alarm indication when the ignition is turned off and/or a door is opened and the audio component 6 is not removed from the sleeve member 2.

The cap member 4 may be made of plastic or other insulating material and may be formed by conventional injection molding techniques or the like well known to those of ordinary skill in the art. The cap member 4 is provided with a hollow cylindrical extension member 62 as shown in FIGS. 1, 2 and 3 to enable cap member 4 to be securely affixed to the back end of the audio component 6 by way of a threaded member such as screw 64. The hollow cylindrical extension member 62 is formed at a location on the cap member 4 which aligns with a corresponding threaded opening in the audio component 6 and the hollow cylindrical extension member 62 will extend inwardly of the cap member 4 a sufficient distance to provide accurate spacing between the terminal block 60 and the metalized back of the audio component 6. Thus, those of ordinary skill in the art will appreciate that once a battery is inserted in battery terminals 58 and each of the leads 41–43 from the terminal block 60 are connected to the back of the audio component 6, the cap member 4 will be placed on the back of the audio component 6 and screw means 64 will be inserted and tightened so as to provide a rigid mounting for the cap member 4.

Figure 7:
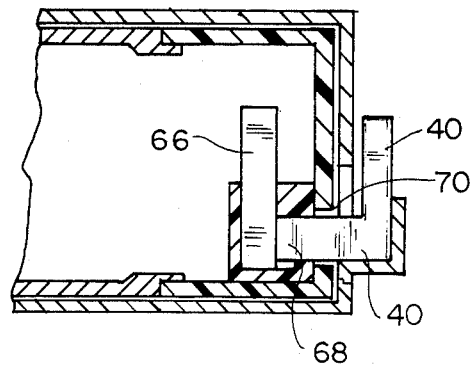
FIG. 7 illustrates the manner in which interconnection between contacts is achieved when a selected audio component having the exemplary cap member illustrated in FIGS. 2 and 3 mounted thereon is disposed within a sleeve member such as shown in FIGS. 4 and 6.
Figure 8:
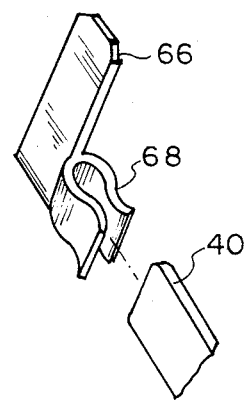
FIG. 8 illustrates an exemplary contact set.

The terminal block 60, as best shown in FIGS. 1 and 3, comprises a plurality of upstanding terminal lugs 66, each of which has attached thereto a pair of biased spade lugs 68 as best shown in FIGS. 7 and 8. The upstanding contacts 66 are disposed within the cap member 4 in the manner best shown in FIG. 3, readily enabling individual conductors 41–43 and B+ to be connected thereto by way of soldering or the like so that such conductors can readily be plugged into corresponding components on the back of the audio component 6. The biased spade lugs 68 of the upstanding contacts 66 are each disposed within an apertured portion 70 of the cap member 4 shown in FIGS. 2 and 7. Thus when an audio component 6 having the cap member 4 mounted thereon is inserted within the sleeve member 2 automatic connection is established between each of the L-shaped contacts 40 on terminal block 38 of the sleeve member 2 and corresponding spade lugs 68 on the terminal block 60, in the manner best shown in FIGS. 7 and 8. Accordingly, a secure and efficient contact is made between each of the L-shaped contacts 40 on terminal block 38 and the upstanding contacts 66 on the terminal block 60.

Those of ordinary skill in the art will appreciate that while L-shaped contacts 40 on terminal block 38 of the sleeve 2 have been shown in connection with the upstanding contacts 66 on terminal block 60 where the spade lugs 68 are employed to establish a tight vibration-free electrical contact, other forms of plug compatible contacting members for mating the connections of the sleeve member 2 to the cap member 4 may be employed. Thus, in certain cases, other coupling members may be utilized to avoid the provision of any exposed contacts within the cap member 4 or the sleeve member 2. However, those of ordinary skill in the art will also appreciate that due to the fixed, spaced mounting achieved by the cap member 4 and the manner in which the biased spade lugs 68 are inserted within the individual apertures 70 in the cap member 4, no problems associated with exposed connections are normally encountered. This is particularly so in light of the fact that the cap member 4, once in place, prevents any contacts from being exposed and accidentally shorted either on the back of the audio component 6 or within the cap member 4. Further, since the cap member 4 is generally specifically configured for the audio component 6 selected the sleeve member 2 is specifically configured for the vehicle type and the cap member 4 is perfectly compatible with the sleeve member 2, full compatibility and ease of installation will be at all times be assured.

The handle bracket 8 comprises a bracket frame 74 and a handle 76. The bracket frame 74, as will be appreciated by those of ordinary skill in the art, is adapted to be slid over the audio component 6 from the back thereof and to engage the extended face plate 78 of the audio component 6 and fixedly held in place thereby. Those of ordinary skill in the art will appreciate that the thickness T of the bracket frame may generally correspond to the thickness of the cap member 4 so that when the assembled audio component 6 and cap member 4 are slid within the sleeve member 2 the handle bracket 8 will extend therefrom by a distance corresponding to thickness T corresponding to the elongation of the audio component 6 caused by a mounting of the cap member 4.

The handle 76, as will be readily appreciated, is employed to slideably mount the audio component 6 and the cap member 4 within the sleeve member 2 and in addition is employed to slideably remove the same from the sleeve and serves as a carrying handle for the audio component when removed. Because the handle bracket 8 will not fit within the sleeve 2, the thickness T thereof may be reduced if desired so that less of the audio component protrudes from the dashboard. This, of course, will be a function of how the deep the sleeve member 2 is which varies as a function of the depth provided by the vehicle manufacturer within the dash. In addition, the sleeve member 2 may have an enlarged front portion to accommodate the bracket frame 74 provided such enlarged portion may be accommodated within the dashboard.

In installing the instant invention a user will specify the vehicle and audio component involved and will be provided with a sleeve member 2 specifically configured for that vehicle and a cap member 4 and handle bracket 8 specifically configured for the audio component defined. Upon installation the sleeve member 2 will be test fit within the dashboard of the vehicle involved and forced into an appropriate position therein. In this regard, the V-shaped cutouts 10 provided will function to force away or displace any materials toward the side of the aperture in the dashboard which are in the way of insertion of the sleeve member 2. It is emphasized that the sleeve member 2 is made of thin sheet metal such as galvanized steel or the like and configured quite closely to the maximum size audio component accommodated by the vehicle in question.

Once an appropriate fit is secured the sleeve member 2 is removed and the wires within the dashboard, including the antenna connection, are secured to the back of the sleeve member 2 in the manner dictated by the contacts 40 and the code associated with the annotations on the terminal block 38 as illustrated in FIGS. 4 and 5. Connection to the terminals may be made on a plug compatible basis such as the case for the antenna lead and power and ground connections. For speaker leads soldered connections or slip on connectors may be employed. Once all connections from the dashboard have been made to the terminal block 38 at the rear of the sleeve member 2, the sleeve member 2 is then again forced into the aperture provided in the dashboard by the vehicle manufacturer.

A tight frictional fit of the sleeve member 2 will be insured due to the construction thereof, while the V-shaped cutouts 10 and the large overlapping cutouts 22 and 24, ensure that no substantial deformation of the sleeve member 2 takes place. Once the sleeve member 2 is insreted within the opening of the dashboard and a proper fit is secured, i.e. one wherein the flange 21 is disposed completely against the front edge of the dashboard cutout, the installer would place a screwdriver into the sleeve member 2 and press out the metal wings within the pairs of U-shaped contacts 14 and 16, as well as those within the tapered cutouts 30 and 32. This would be done on each side of the sleeve member 2 as well as on the top and bottom thereof.

Due to the disposition of the tapered cutouts 30 and 32, i.e. their varied location on the top and bottom surfaces of the sleeve member 2, and the aslantly disposed forward edge thereof, engagement with the internal edge of the cutout in the dashboard is assured. Further the installer may insure that proper location of the sleeve member 2 occurs by pressing the flange thereof against the front edge of the dashboard and then pushing up on the tapered cutouts until a tight non-shifting fit is secured. In addition, for the sleeve member 2, illustrated in FIG. 1, a screwdriver would also be used to displace the bendable projections 34 and 36 which in the case of a Mercedes would interact with the ashtray mounts. Those of ordinary skill in the art will appreciate that since the sleeve member 2 is designed specifically for the vehicle in which it is to be installed, the spring clips and other mounting hardware provided by the manufacturer of the vehicle for the installation of an audio component may be used with sleeve member 2 to additionally secure the same in an appropriate location.

Once the sleeve member 2 has been fixedly mounted within the dashboard of the vehicle, as aforesaid, the cap member 4 and handle bracket 8 will be mounted to the audio component 6. First, the handle bracket 8 will be slipped onto the audio component 6 until the same engages the extended face plate 78 or other enlarged member of the audio component 6. Once this is done, appropriate connectors for the audio component 6 will be soldered to the upstanding contacts 66 on the terminal block 60 if the same are not already provided. In this regard, it should be noted that since in most cases the cap member 4 is specifically designed for the audio component 6 selected by a user, all leads therefor, such as illustrated by the antenna lead 41, the speaker leads 42 and 43 and the power lead B+ may already be provided. With the leads in place the same are merely plugged into the back of the audio component 6 in the manner specified by the manufacturer of the audio component. A 9 volt battery may also be connected to the battery terminals 58 to provide power, as aforesaid, for maintaining the memories within the audio component 6 when the same is removed from sleeve member 2.

After completing all connections the cap member 4 is slipped onto the back of the audio component in such manner that each of the protrusions 48–51, 53 and 54 engage the cutouts 44–47, 55 and 56. This insures a proper fit to the back of the audio component 6, avoiding any deviation in the peripheral shape or cross-sectional size of the assembled unit. Thereafter, a screw means 64 as shown in FIG. 2 is inserted within the hollow cylindrical extension member 62 to provide a tight fit with adequate spacing to preventing shorting between the upstanding contacts 66 and the back of the audio component 6.

Having completed the foregoing assembly, which in most cases is easier than installing an audio component 6 within a dashboard, the instant invention and radio component 6 are ready for operation. Thus, if the user desires to use the audio component 6 the same is slipped into the sleeve member 2 and pushed all the way back until the handle bracket 8 and more particularly the bracket frame 74 are fully disposed against the sleeve member 2. As this occurs, each of the L-shaped contacts 40 at the lower left hand portion of the sleeve member 2 as shown in FIG. 1 will be inserted within the aperture 70 of the cap member 4 as shown in FIG. 2 so that a tight, vibration free contact is established between each contact 40 and the spring biased spade lug 68 of the terminal block 60 is achieved in the manner best seen in connection with FIGS. 7 and 8. Under these circumstances those of ordinary skill in the art will appreciate that full power, the antenna connections and the like, will be supplied to the audio component as if the same were directly connected to the conductors provided within the dashboard.

When the vehicle is placed in a location where the same is at risk, the user merely pulls handle 76 which will cause the entire assembly of the audio component 6, the handle bracket 8 and the cap member 4 to be removed from the sleeve member 2 and dashboard whereupon the entire assembly may be placed within a carrying case, briefcase, the trunk of the vehicle or other secure location. Once this is done, a casual observer of the vehicle will note that only an empty aperture is present in the dashboard location normally utilized for an audio component and hence that attempted theft from the vehicle involved would be pointless.

Those of ordinary skill in the art will appreciate that the instant invention achieves what is in effect a custom installation because the sleeve member 2 is specially configured for the vehicle involved while the cap member 4 and the handle 8 are specifically configured for the audio component 6 selected. In all cases the cap member 4 is perfectly compatible on a plug removable basis with the sleeve means 2. The instant invention admits of additional features not illustrated in FIG. 1. For instance, the battery connected to the battery terminals 58 may be of the rechargeable variety and an additional aperture may be provided in the back of the cap member 4 with appropriate terminals for accepting a plug cord from a conventional charger. Thus in cases where the audio component 6 is removed from the vehicle overnight, such rechargeable battery may be left to charge during the evening hours.

Further, should any difficulty be incurred in tightly securing the sleeve member 2 within the dashboard, the same may readily be bolted therein in the conventional manner without either causing difficulty or fears that should a thief attempt to steal the audio component, substantial damage will be done to the dashboard since in all cases either the audio component 6 will be removed therefrom or the same may be removed by simply pulling the handle 8.

Referring now to FIG. 9 there is shown an exemplary view of another embodiment of the present invention. This embodiment, it should be noted, is generally configured for the mounting of audio components provided by manufacturers such as Alpine into the dashboard of vehicle manufactured by BMW.

The embodiment of the invention illustrated in FIG. 9 comprises a sleeve member 86, a cap member 88, a mounting member 90, an audio component 92 and a handle bracket 94 which is here shown already mounted on the audio component 92. The sleeve member 86 is generally similar to the sleeve member 2 illustrated in FIG. 1 except here the tapered cutouts 30 and 32 and the bendable projections 34 and 36 are omitted and instead additional pairs of U-shaped cutouts 96 and 98 are provided on the top and bottom of the sleeve member 86 in a manner to either accommodate the spring clips utilized by vehicle manufacturers such as BMW, or alternatively pressed out to replace such spring clips. In all other respects the sleeve member 86 corresponds to the sleeve member 2 described in connection with FIG. 1 and hence a more detailed description thereof is not set forth.

Similarly, the cap member 88 corresponds in most respects to the cap member 4 illustrated in FIG. 1 except in FIG. 9 large corner protrusions 100 and 102 are provided in the upper corners of the cap member 88 to overlie and seal corresponding cutouts 104 and 106 typically used in audio components manufactured by Alpine. The nature of the contacts present on both the sleeve member 86 and the cap member 88 may be identical to those described in connection with FIG. 1 and hence a description thereof is not reiterated here. The cap member 88, however, as shown in FIG. 9, is not provided with a hollow cylindrical extension member 62 as shown in FIG. 1. Instead, a mounting member 90 is provided to be mounted to the audio component 92 by way of screws 108 and 110 which are inserted through the mounting member 90 into threaded apertures provided in the audio component 92. Thereafter, the mounting member 90 is fixedly secured to the cap member 88 with screws 112 and 114 which are inserted through apertures which are preferably counter-such in the cap member 88 to threaded apertures on the mounting member 90 in the manner indicated in FIG. 9. With this mounting technique, the mounting member 90 serves to space the back of the audio component 92 from the internal contacts present within the cap member 88 while the cap member 88 again acts to seal the entire back of the audio component 92 from dust and prevent the back of the audio component 92 from shorting. As will be appreciated by those of ordinary skill in the art, exact spacing of the audio component 92 from interior portions of the cap member 88 is provided by spacing members 116–119. The use of the mounting member 90 is highly advantageous when the cap member 88 contains non-symmetrical projections such as 100 and 102 as it avoids any shifting of the cap member 88 which might in fact result. The mounting, use and installation of the embodiment of the invention illustrated in FIG. 9 is otherwise precisely the same as described in connection with FIGS. 1–8 and hence shall not be reiterated.

Referring now to FIG. 10 there is shown another embodiment of a cap member which may be employed in the embodiments of this invention similar to that depicted in FIG. 9 where it is desired to avoid use of the mounting member 90. The cap member 120 illustrated in FIG. 10 is internally configured in the same manner as the cap members 4 and 88 illustrated in FIGS. 1 and 9 respectively. Here, however, a plurality of apertures 126–130, which may be associated with cylindrical protrusions internal to the cap member 88, as was the case for protrusion 62 in FIG. 1, are employed to provide spacing as well as direct mounting to the back of the audio component. The apertures 126–130 are arranged in such a manner as to be spatially related to one or more threaded openings on the back of an audio component so that cap members such as illustrated in FIG. 10 may accommodate one or a class of audio components.

Those of ordinary skill in the art will appreciate that additional adaptations and modifications of the instant invention are available. Thus, separate power connections which may be transformed from a conventional AC source and rectified either internally or externally, may be provided together with additional speaker outputs as required by the component. Additionally, speaker outputs or amplified inputs may be provided so that when removed from the vehicle the audio component may be utilized in connection with separate speakers in a manner reminiscent of what is often done with Walkman devices. In addition, while electrical coupling has been illustrated with specific forms of plug compatible contacts between the embodiments of the cap members and sleeve members discussed herein, it will be appreciated that specialized plug compatible contact sets may be used as well. Additionally, optical coupling may be employed to achieve interconnections.

Thus, although the instant invention has been described in connection with highly specific exemplary embodiments thereof, it will be understood that many modifications and variations thereof will be readily available to those of ordinary skill in the art. Therefore it is manifestly intended that this invention be only limited by the claims and the equivalents thereof.

What is claimed is:

1. Anti-theft mounting apparatus comprising:
sleeve member means for fixedly mounting within a dashboard of a vehicle, said sleeve member means being configured to accept an audio component therein and to tightly mount within a standard dashboard opening, said sleeve member means having contacts for connection to speaker, antenna and power leads present in said dashboard and vee-shaped cutouts in side portions thereof enabling said sleeve member means to be force fit within a dashboard without substantial deformations of said sleeve member, said vee-shaped cutouts being configured to trim away minor obstacles in their path when said sleeve member means is force fit within a dashboard, said contacts on said sleeve member means being extended from the rear of said sleeve member for connection to said leads present in said dashboard and provided as a plug compatible array internal to said sleeve member; and
cap member means for fixedly mounting to the rear of an audio component, said cap member means having a recessed contact set for engaging each of said contacts in said plug compatible array internal to said sleeve member means, said contact set being disposed to the rear of said cap member means and recessed in a manner to avoid contamination of contacts therein, said contact set being disposed internally to said cap member means for providing speaker, antenna and power connections to an audio component on which said cap member means is fixedly mounted.

2. The anti-theft mounting apparatus according to claim 1 wherein said sleeve member means additionally includes a plurality of extendible tabs disposed toward the front of the top and bottom surfaces thereof, each of said plurality of extendible tabs having an aslantly disposed leading edge for adjustably engaging said dashboard.

3. The anti-theft mounting apparatus according to claim 1 additionally comprising extendible U-shaped tabs disposed toward the front of the top surface of said sleeve member for engaging ashtray structure in said dashboard.

4. The anti-theft mounting apparatus according to claim 1 wherein said cap member means is provided with cutouts and protrusions for mating with protrusions and cutouts present on specific brands of audio components enabling said cap member means to effectively seal dirt and dust from the rear of said audio components.

5. The anti-theft mounting apparatus according to claim 1 additionally comprising handle bracket means for mounting toward the front of said audio component.

6. The anti-theft mounting apparatus according to claim 1 additionally comprising spacer member means, said spacer member means taking the form of a plate-like member to be separately secured to said audio component and said cap member means and disposed therebetween.

7. The anti-theft mounting apparatus according to claim 1 wherein said sleeve member means is specifically configured to dashboard mounting specifications of a particular brand of vehicle.

8. The anti-theft mounting apparatus according to claim 1 additionally comprising at least one aperture to the rear of said cap member means for fixedly mounting said cap member means in a spaced relationship to said audio component.

9. The anti-theft mounting apparatus according to claim 1 wherein said cap member means is provided with means for connecting a battery thereto for maintaining memory present in said audio component.

10. The anti-theft mounting apparatus according to claim 2 wherein said cap member means is provided with contacts and protrusions for mating with protrusions and contacts present in specific brands of audio components enabling said cap member means to effectively seal dirt and dust from the rear of said audio component.

11. The anti-theft mounting apparatus according to claim 2 additionally comprising spacer member means, said spacer member means taking the form of a plate-like member to be separately secured to said audio component and said cap member means and disposed therebetween.

12. The anti-theft mounting apparatus according to claim 10 additionally comprising spacer member means, said spacer member means taking the form of a plate-like member to be separately secured to said audio component and said cap member means and disposed therebetween.

13. The anti-theft mounting apparatus according to claim 2 wherein said sleeve member means is specifically configured to dashboard mounting specifications of a particular brand of vehicle.

14. The anti-theft mounting apparatus according to claim 10 wherein said cap member means is provided with means for connecting a battery thereto for maintaining memory present in said audio component.

15. Anti-theft mounting apparatus comprising:
sleeve member means for fixedly mounting within a dashboard of a vehicle, said sleeve member means being configured to accept an audio component therein and to tightly mount within a standard dashboard opening, said sleeve member means having contacts for connection to speaker, antenna and power leads present in said dashboard and including a plurality of extendible tabs disposed on each of top and bottom surfaces thereof, said plurality of extendible tabs being located toward the front of said top and bottom surfaces and arranged in symmetrical pairs on each of said top and bottom surfaces, each of said plurality of extendible tabs having an aslantly disposed leading edge for adjustably engaging said dashboard, said symmetrical pairs of extendible tabs on each of said top and bottom surfaces being variably spaced from the front of the top and bottom surfaces of said sleeve member to isure engagement with portions of said dashboard surrounding said opening, said contacts on said sleeve member means being extended from the rear of said sleeve member for connection to said leads present in said dashboard and provided as a plug compatible array internal to said sleeve member; and cap member means for fixedly mounting to the rear of an audio component, said cap member means having a recessed contact set for engaging each of said contacts in said plug compatible array internal to said sleeve member means, said contact set being disposed to the rear of said cap member means, and being recessed in a manner to avoid contamination of contacts therein, said contact set being disposed internally to said cap member means for providing speaker, antenna and power connections to an audio component on which said cap member means is fixedly mounted.

16. The anti-theft mounting apparatus according to claim 15 additionally comprising vee-shaped cutouts in side portions of said sleeve member means enabling said sleeve means to be force fit within a dashboard without substantial deformation of said sleeve member.

17. The anti-theft mounting apparatus according to claim 15 additionally comprising extendible U-shaped tabs disposed toward the front of the top surface of said sleeve member for engaging ashtray structures in said dashboard.

18. The anti-theft mounting apparatus according to claim 15 wherein said cap member means is provided with cutouts and protrusions for mating with protrusions and cutouts present on specific brands of audio components enabling said cap member means to effectively seal dirt and dust from the rear of said audio component.

19. The anti-theft mounting apparatus according to claim 15 additionally comprising handle bracket means for mounting toward the front of said audio component.

20. The anti-theft mounting apparatus according to claim 15 additionally comprising spacer member means, said spacer member means taking the form of a plate-like member to be separately secured to said audio component and said cap member means and disposed therebetween.

21. The anti-theft mounting apparatus according to claim 15 wherein said sleeve member means is specifically configured to dashboard mounting specifications of a particular brand of vehicle.

22. The anti-theft mounting apparatus according to claim 15 additionally comprising at least one aperture to the rear of said cap member means for fixedly mounting said cap member means in a spaced relationship to said audio component.

23. The anti-theft mounting apparatus according to claim 15 wherein said cap member means is provided with means for connecting a battery thereto for maintaining memory present in said audio component.

24. The anti-theft mounting apparatus according to claim 15 additionally comprising vee-shaped cutouts in side portions of said sleeve member means enabling said sleeve means to be force fit within a dashboard without substantial deformation of said sleeve member.

25. The anti-theft mounting apparatus according to claim 24 additionally comprising extendible U-shaped tabs disposed toward the front of the top surface of said sleeve member for engaging ashtray structure in said dashboard.

26. The anti-theft mounting apparatus according to claim 25 wherein said cap member means is provided with cutouts and protrusions for mating with protrusions and cutouts present in specific brands of audio components enabling said cap member means to effectively seal dirt and dust from the rear of said audio component.

27. The anti-theft mounting apparatus according to claim 25 additionally comprising spacer member means, said spacer member means taking the form of a plate-like member to be separately secured to said audio component and said cap member means and disposed therebetween.

* * * * *